(12) United States Patent
Koo et al.

(10) Patent No.: US 8,789,088 B2
(45) Date of Patent: Jul. 22, 2014

(54) METHOD AND APPARATUS FOR REMOTELY INSTALLING AND UPDATING DIFFERENT SECURITY CLIENTS FOR BROADCASTING OR COMMUNICATION CHANNELS

(75) Inventors: Han-Seung Koo, Daejeon (KR); O-Hyung Kwon, Daejeon (KR); Dong-Joon Choi, Daejeon (KR); Soo-In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 88 days.

(21) Appl. No.: 13/077,470

(22) Filed: Mar. 31, 2011

(65) Prior Publication Data

US 2011/0247032 A1     Oct. 6, 2011

(30) Foreign Application Priority Data

Mar. 31, 2010    (KR) .................. 10-2010-0028936

(51) Int. Cl.
*H04N 7/16*    (2011.01)
*H04N 7/167*   (2011.01)
*H04N 21/418*  (2011.01)

(52) U.S. Cl.
CPC ......... *H04N 7/1675* (2013.01); *H04N 21/4181* (2013.01)
USPC .................. 725/27; 725/28; 725/31

(58) Field of Classification Search
CPC .................. H04N 7/1675; H04N 21/4181
USPC ................................ 725/27, 28
See application file for complete search history.

(56) References Cited

U.S. PATENT DOCUMENTS

| | | | | |
|---|---|---|---|---|
| 8,204,220 | B2* | 6/2012 | Candelore | 380/44 |
| 8,208,799 | B2* | 6/2012 | Phan | 386/328 |
| 2006/0137015 | A1* | 6/2006 | Fahrny et al. | 726/26 |
| 2008/0095365 | A1* | 4/2008 | Cocchi et al. | 380/228 |
| 2008/0313463 | A1* | 12/2008 | Depietro et al. | 713/170 |
| 2009/0083780 | A1* | 3/2009 | Beyabani | 725/14 |
| 2009/0150672 | A1 | 6/2009 | Kwon et al. | |
| 2009/0208006 | A1* | 8/2009 | Candelore | 380/200 |
| 2011/0162021 | A1* | 6/2011 | Lee | 725/93 |
| 2011/0311045 | A1* | 12/2011 | Candelore et al. | 380/210 |

FOREIGN PATENT DOCUMENTS

| | | |
|---|---|---|
| JP | 2005-100445 | 4/2005 |
| KR | 1020070103211 | 10/2007 |
| KR | 1020070128552 | 12/2007 |
| KR | 1020090060528 | 6/2009 |
| KR | 1020090095777 | 9/2009 |
| KR | 1020100058840 | 6/2010 |

* cited by examiner

*Primary Examiner* — Nasser Goodarzi
*Assistant Examiner* — Michael B Pierorazio
(74) *Attorney, Agent, or Firm* — Nelson Mullins Riley & Scarborough LLP

(57) ABSTRACT

A method for installing different security clients for channels in a terminal in a conditional access system includes: searching one or more channels searchable in the terminal; requesting, for respective searched channels, security clients necessary for receiving pay programs to be transmitted through the searched channels, to a broadcasting station which takes charge of the searched channels; and downloading and installing, for respective searched channels, the requested security clients from the broadcasting station.

12 Claims, 7 Drawing Sheets

FIG. 4

Currently, there is no searched channel.
Do you want to start automatic channel search?

[Yes] [No]

(A)

Currently, CAS S/W for watching pay program
is not installed at all.
Do you want to download CAS S/Ws for
all channels in advance?
(Several minutes are required for this process.)

[Yes] [No]

(B)

This program is pay program.
CAS S/W necessary for watching this program
is not installed.
For watching, you should download and
install corresponding CAS S/W.
Do you want to continue?

[Yes] [No]

(C)

FIG. 8
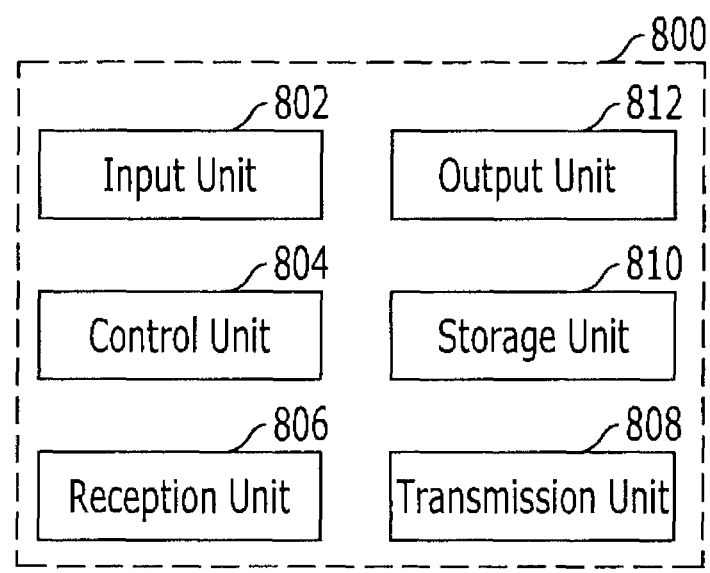
(A)
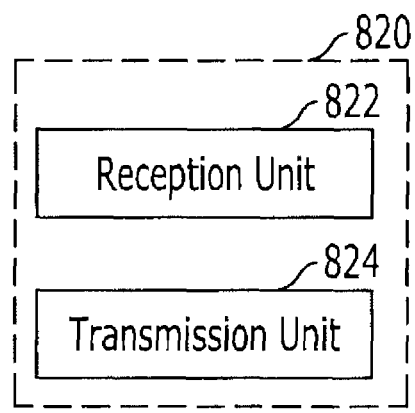
(B)

US 8,789,088 B2

METHOD AND APPARATUS FOR REMOTELY INSTALLING AND UPDATING DIFFERENT SECURITY CLIENTS FOR BROADCASTING OR COMMUNICATION CHANNELS

CROSS-REFERENCE(S) TO RELATED APPLICATIONS

The present application claims priority of Korean Patent Application No. 10-2010-0028936 filed on Mar. 31, 2010, which is incorporated herein by reference in its entirety.

BACKGROUND OF THE INVENTION

1. Field of the Invention

Exemplary embodiments of the present invention relate to a method and an apparatus for remotely installing and updating different security clients for broadcasting or communication channels.

2. Description of Related Art

A system for allowing only a user, who pays a receiving fee after subscribing toll broadcasting, to watch a specific program is called a conditional access system (CAS), and a CAS client software placed in a terminal to realize the CAS is called a CAS S/W. For example, whether or not a user is qualified to watch a specific program (for example, whether or not a receiving fee has been paid) is determined using the CAS S/W, and thereby, it is possible realize the CAS is called a CAS S/W. For example, whether or not a user is qualified to watch a specific program (for example, whether or not a receiving fee has been paid) is determined using the CAS S/W, and thereby, it is possible to provide the specific program only to the user who is qualified to watch the specific program.

In a conventional cable television, a CAS is managed by using one CAS S/W for all channels. However, in the case where different CAS S/Ws are used for respective channels (broadcasting stations) as in terrestrial TV broadcasting and DMB (digital multimedia broadcasting), problems are caused in that the different CAS S/Ws should be installed and updated for respective channels (broadcasting stations) and a CAS S/W suitable for a specific program selected by a user should be selected among the plurality of CAS S/Ws.

SUMMARY OF THE INVENTION

Embodiments of the present invention are directed to a method and an apparatus in which, when respective channels (or respective programs) use different security clients, all the security clients can be remotely installed and updated in a terminal, so that a security client conforming to a specific program selected by a user can be selected to permit watching of the specific program.

In accordance with an embodiment of the present invention, a method for installing different security clients for channels in a terminal in a conditional access system includes: searching one or more channels searchable in the terminal; requesting, for respective searched channels, security clients necessary for receiving pay programs to be transmitted through the searched channels, to a broadcasting station which takes charge of the searched channels; and downloading and installing, for respective searched channels, the requested security clients from the broadcasting station.

In accordance with another embodiment of the present invention, a method for installing different security clients for channels in a terminal in a conditional access system, includes: receiving security clients necessary for receiving pay programs to be transmitted through one or more channels, which are repeatedly broadcasted through respective broadcasting stations which take charge of the respective channels; and installing the security clients received from the respective broadcasting stations.

In accordance with another embodiment of the present invention, a terminal for installing different security clients for channels in a conditional access system includes: a control unit configured to search one or more channels searchable in the terminal; a reception unit configured to request, for respective searched channels, security clients necessary for receiving pay programs to be transmitted through the searched channels, to a broadcasting station which takes charge of the searched channels; and a transmission unit configured to download and install, for respective searched channels, the requested security clients from the broadcasting station, wherein the control unit installs the downloaded security clients.

In accordance with another embodiment of the present invention, a terminal for installing different security clients for channels in a conditional access system includes: a reception unit configured to receive security clients necessary for receiving pay programs to be transmitted through one or more channels, which are repeatedly broadcasted through respective broadcasting stations which take charge of the respective channels; and a control unit configured to install the security clients received from the respective broadcasting stations.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 4 is a view showing a user interface in accordance with another embodiment of the present invention.

FIG. 8 is of diagrams showing the configurations of a terminal and a broadcasting station in the conditional access system in accordance with another embodiment of the present invention.

DESCRIPTION OF SPECIFIC EMBODIMENTS

Figure 1:
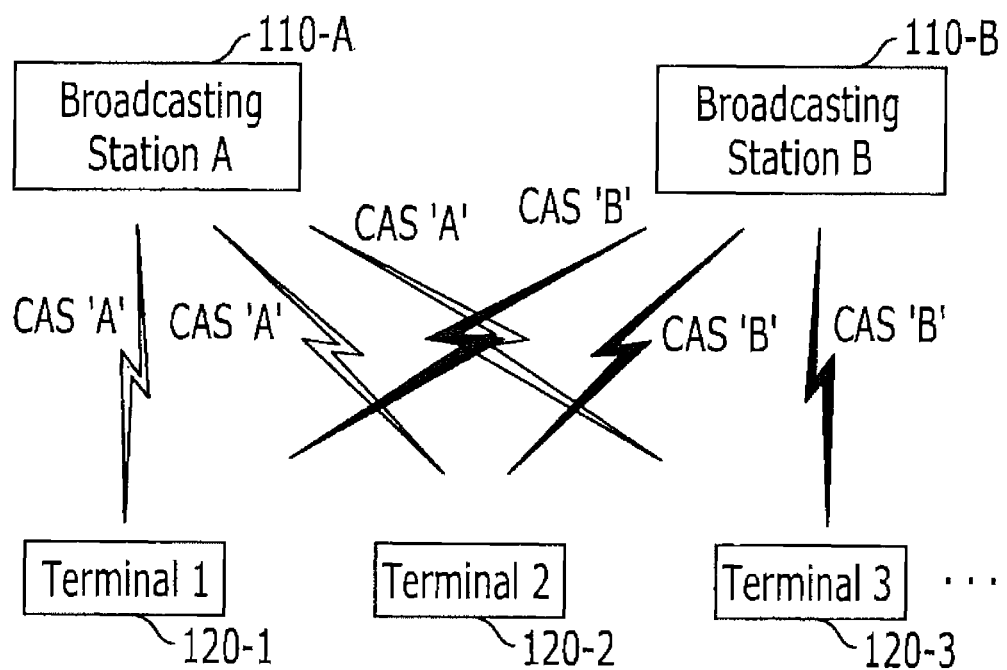
FIG. 1 is diagram explaining a conditional access system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is diagram explaining a conditional access system in accordance with an embodiment of the present invention. Respective components of the conditional access system according to the present invention will be described below with reference to FIG. 1.

A broadcasting station serves as a provider providing multimedia contents including one or more of various types of information or contents such as video, audio, data, etc. The broadcasting station may be, for example, but not limited to, a provider of wired/wireless broadcasting and/or wired/wireless communication service. A terminal stands for all types of receivers capable of receiving multimedia contents provided by a broadcasting station.

All kinds of physical or logical channels used for transporting multimedia contents from a broadcasting station to a terminal are called broadcasting channels or channels and include communication channels which are used in the case where a broadcasting station is a communication service provider. In this regard, in opposition to a broadcasting channel connected from a broadcasting station to a terminal, a channel connected from a terminal to a broadcasting station is called a return channel. Depending upon whether such a return channel is supported or not, terminals are divided into a unidirectional terminal and a bidirectional terminal. That is to say, a unidirectional terminal indicates a terminal which does not have a function of providing a return channel from a terminal to a broadcasting station, and a bidirectional terminal indicates a terminal which has a function of providing a return channel from a terminal to a broadcasting station.

Multimedia contents provided through a broadcasting channel are called a program, and in particular, multimedia contents provided through a broadcasting channel with pay are called a pay program.

A system for providing a specific program only to a user (a terminal) qualified to watch the corresponding specific program is called a conditional access system (CAS), and a client software placed in a terminal to realize the conditional access system is called a CAS S/W or a security client (since the client software is a module for administrating a watch qualification, it is also called a watch qualification administration module). For example, whether or not a program is a program which may be restricted in watching and whether or not a user is qualified to watch the corresponding program are determined using the security client, and thereby, it is possible to provide the corresponding program only to the user who is qualified to watch the corresponding program. For example, the conditional access system may support only a user (a terminal) who has paid a receiving fee for a specified pay program, to watch the corresponding pay program.

Further, in the present invention, a channel which is safe in terms of security by using various security techniques (for example, a broadcasting channel and/or a return channel) is called a security channel, and it is preferred that various security factors such as a CAS S/W be transported between a broadcasting station and a terminal through the security channel. The security channel may be realized, for example, by using an SSL (secure sockets layer) protocol or a TLS (transport layer security) protocol.

Hereafter, for the sake of convenience in explanation, descriptions will be made for a conditional access system which provides a pay program only to a user (a terminal) who is qualified to watch the corresponding pay program, and a program, which may be restricted in watching by the conditional access system depending upon a condition, is not limited to a pay program.

Referring to FIG. 1, a conditional access system in accordance with an embodiment of the present invention may include one or more broadcasting stations 110-A and 110-B and one or more terminals 120-1, 120-2 and 120-3. According to a first exemplary embodiment, the respective broadcasting stations 110-A and 110-B may use different CAS S/Ws to provide pay programs to the terminals 120-1, 120-2 and 120-3. For example, the broadcasting station A 110-A may use a CAS S/W A, and the broadcasting station B 110-B may use a CAS S/W B. In the present invention, the use of the different CAS S/Ws for the respective broadcasting stations may mean the use of different CAS S/Ws for respective broadcasting channels to which the broadcasting stations belong. According to a second exemplary embodiment, different CAS S/Ws may be used for respective pay programs. For example, the broadcasting station A 110-A may use a CAS S/W 1 for a pay program 1 a CAS S/W 2 for a pay program 2. According to a third exemplary embodiment, the first exemplary embodiment and the second exemplary embodiment may be used by being mixed with each other. That is to say, the broadcasting station A 110-A may make it a rule to use a CAS S/W A for a plurality of pay programs which are provided by the broadcasting station A 110-A, and may use a separate CAS S/W for a specific pay program. For example, the broadcasting station A 110-A may use a CAS S/W 1 for a pay program 1, may use a CAS S/W 2 for a pay program 2, and may use a CAS S/W A for a pay program 3 which has not been separately set.

Figure 2:
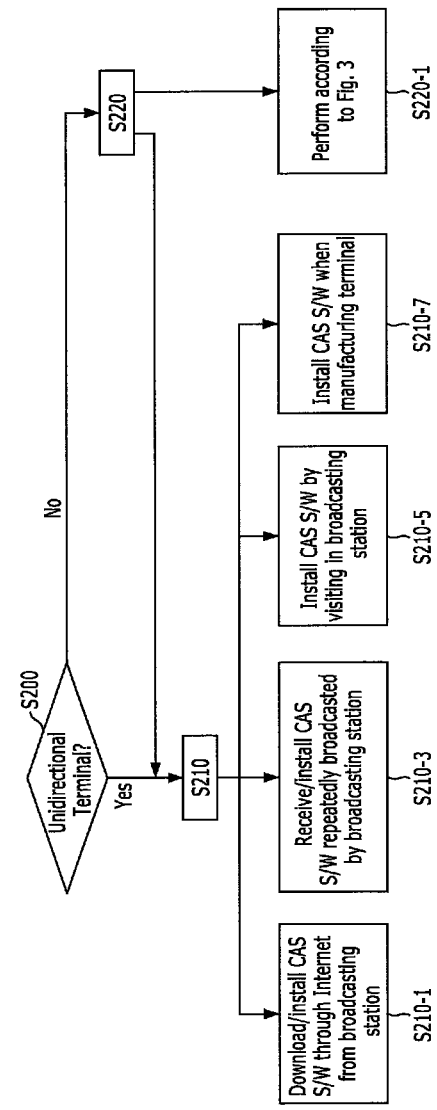
FIG. 2 is a flow chart explaining a method for initially installing a CAS S/W in a terminal in accordance with another embodiment of the present invention.

Hereinbelow, a method for initially installing a CAS S/W in a terminal will be described with reference to FIGS. 2 and 3. In detail, a method for installing a CAS S/W in a terminal before a user receives a toll broadcasting service through the terminal after the manufacture of the terminal will be described.

First, the case of a unidirectional terminal will be described. In the case where a terminal is a unidirectional terminal (S200: Yes), a CAS S/W may be installed using any one of steps S210-1, S210-3, S210-5 and S210-7 (S210). Only some of the steps S210-1, S210-3, S210-5 and S210-7 may be possible depending upon a policy of a terminal manufacturer or a broadcasting station.

Describing the step S210-1, after a terminal is connected to a broadcasting station or a trusted third party by a user using a bidirectional channel such as Internet or a PSTN (public switched telephone network), the terminal downloads a CAS S/W from the broadcasting station or the trusted third party and installs the downloaded CAS S/W. The bidirectional channel in the step S210-1 may be all kinds of bidirectional channels excluding the above-described broadcasting channel and return channel. Here, the terminal may securely download the CAS S/W through a bidirectional channel of which confidentiality is ensured, by using a cryptographic method such as user authentication and/or device authentication.

The step S210-3 is a method in which a broadcasting station or a trusted third party repeatedly transmits a CAS S/W through a channel (for example, a broadcasting channel) which is connected between the broadcasting station or the trusted third party and a terminal. In an exemplary embodiment, transmission may be performed through broadcasting. Also, the CAS S/W may be transmitted periodically. The step S210-3 is similar to a DSM-CC (digital storage media command and control) carousel in which the same data/object is periodically transmitted with a predetermined interval in data broadcasting. Describing the step S210-3, the broadcasting station or the trusted third party repeatedly transmits the CAS S/W through the channel which is connected between the broadcasting station or the trusted third party and the terminal, and the terminal receives and installs the CAS S/W.

The step S210-5 is a method in which a user with a terminal directly visits in a broadcasting station or a trusted third party and installs a CAS S/W.

The step S210-7 is a method in which a terminal manufacturer is provided with a CAS S/W from a broadcasting station and/or a CAS S/W manufacturer and originally installs the CAS S/W in a memory.

In the case where a terminal is a bidirectional terminal (S200: No), a CAS S/W may be installed using any one of steps S210-1, S210-3, S210-5, S210-7 and S220-1 (S210). Only some of the steps S210-1, S210-3, S210-5 and S210-7 may be possible depending upon a policy of a terminal manufacturer or a broadcasting station.

Figure 3:
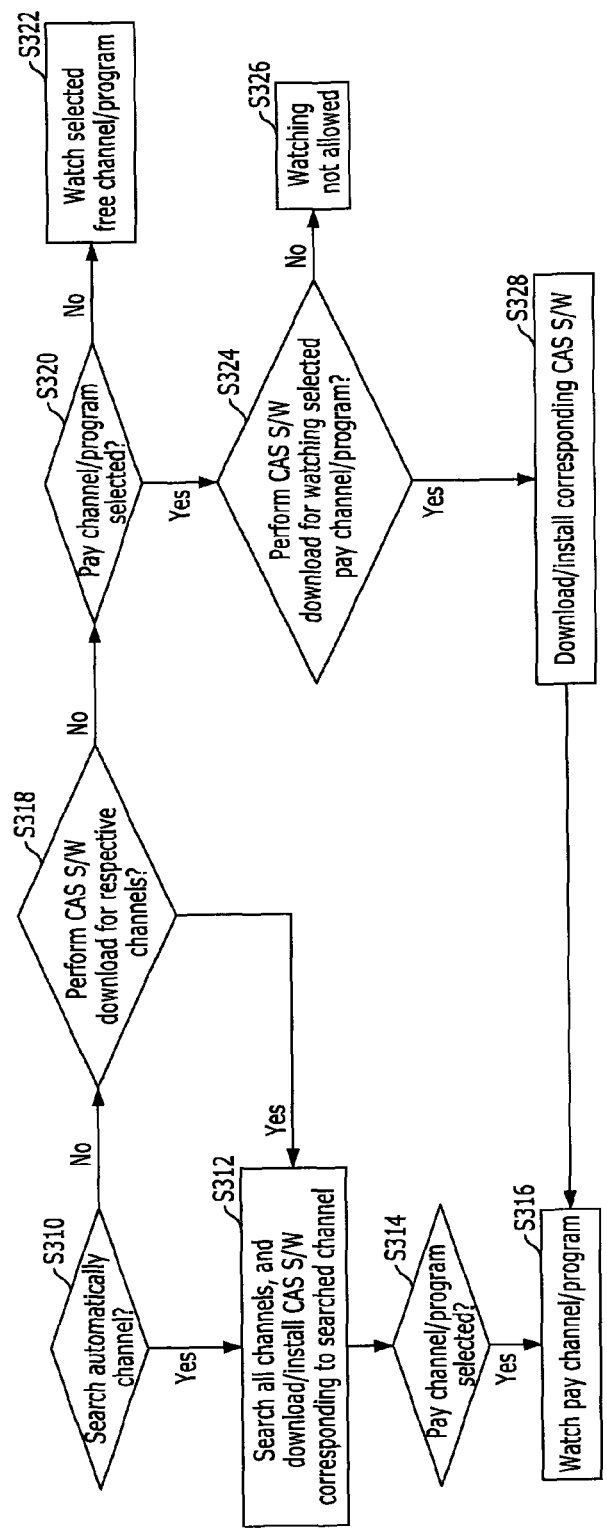
FIG. 3 is a flow chart explaining a method for initially installing a CAS S/W in a bidirectional terminal in accordance with another embodiment of the present invention.

In the step S220-1, a CAS S/W is installed according to a method shown in FIG. 3. Hereafter, an exemplary embodiment of initially installing a CAS S/W in a bidirectional terminal will be described with reference to FIG. 3.

First, whether to automatically search a broadcasting channel is determined (S310). In the case of a terminal which is not ever used after being placed on the market or a terminal which is initialized by a user, information for a broadcasting channel is not stored in a memory. Accordingly, in the case where the information for the broadcasting channel is not stored in the memory of the terminal, the terminal may determine to automatically search a broadcasting channel (S310: Yes). In another embodiment, in the case where the information for the broadcasting channel is not stored in the memory of the terminal, the terminal may be inputted with whether to automatically search a broadcasting channel, from a user (S310), for example, through a user interface shown in (A) of FIG. 4.

When it is determined to automatically search a broadcasting channel (S310: Yes), the terminal searches broadcasting channels one by one and downloads a CAS S/W which corresponds to a searched broadcasting channel (S312). The CAS S/W corresponding to the searched broadcasting channel means a CAS S/W necessary for reception of a pay program to be transmitted through the searched broadcasting channel (in a broad sense, reception and watching of a pay program), and may be provided in the same pattern as in the first, second and third exemplary embodiments. The terminal downloads the CAS S/W corresponding to the searched broadcasting channel through a channel connected to a corresponding broadcasting station or a trusted third party. For example, the terminal may download the CAS S/W through the searched broadcasting channel as a channel connected to the corresponding broadcasting station. When downloading the CAS S/W in the step S312, the terminal may check whether a corresponding CAS S/W exists in the memory. If the corresponding CAS S/W exists in the memory and a version thereof is the same as the version of a CAS S/W to be transmitted from the broadcasting station or the trusted third party, downloading of the corresponding CAS S/W is omitted, and the sequence may proceed to a process for a next broadcasting channel. The downloaded CAS S/W may be installed in the step S312 or may be installed afterwards at a timing when the downloaded CAS S/W becomes necessary to watch the pay program selected by the user.

After CAS S/Ws corresponding to all channels searched through the step S312 are downloaded, if a pay program is selected by the user (S314: Yes), the terminal allows the user to watch the pay program, by using a CAS S/W for the selected pay program among the already downloaded CAS S/Ws (S316). Since the selection, reception and watching of a program means the selection, reception and watching of a broadcasting channel (channel) through which the program is transmitted, a program is represented in FIG. 3 as a pay channel/program or a free channel/program depending upon whether the program is to be paid or not.

After the CAS S/Ws corresponding to the all channels searched through the step S312 are downloaded, if a free channel/program is selected by a user, the user can watch the selected free channel/program without a CAS S/W.

After it is determined not to automatically search broadcasting channels (S310: No), if a free channel/program is selected by the user (S320: No), since a CAS S/W is not needed, the user may watch the corresponding free channel/program through the terminal (S322).

After it is determined not to automatically search broadcasting channels (S310: No), if a pay channel/program is selected by the user (S320: Yes), whether or not to perform a process of downloading a CAS S/W for reception of the selected pay channel/program is determined (S324). At this time, the terminal may be inputted with whether or not to perform the process of downloading a CAS S/W for reception of the selected pay channel/program, from the user (S324), for example, through a user interface shown in (C) of FIG. 4.

When it is determined not to perform the process of downloading a CAS S/W for reception of the selected pay channel/program (S324: No), since the necessary CAS S/W does not exist, the user may not watch the selected pay channel/program (S326).

When it is determined to perform the process of downloading a CAS S/W for reception of the selected pay channel/program (S324: Yes), the terminal downloads and installs the corresponding CAS S/W (S328). When the corresponding CAS S/W is installed, the terminal may allow the user to watch the selected pay channel/program, by using the corresponding CAS S/W (S316).

In the case where CAS S/Ws for respective broadcasting channels have not been already downloaded through the step S312, every time a channel/program is selected by the user, the steps from the step S320, that is, the steps S320, S322, S324, S326, S328 and S316 are implemented. Accordingly, if a pay channel/program is selected by the user (S320: Yes), whether or not a CAS S/W for reception of the selected pay channel/program exists in the memory of the terminal may be checked in the step S324. If the corresponding CAS S/W exists in the memory and a version thereof is the same as the version of a CAS S/W to be transmitted from a corresponding broadcasting station or a trusted third party, it is not necessary to implement the step S328, and it is possible to watch the pay channel/program by using the already stored CAS S/W.

In a first variation of the embodiment described above with reference to FIG. 3, after it is determined not to automatically search a broadcasting channel (S310: No), the terminal may determine whether to separately perform downloading of CAS S/Ws for the respective broadcasting channels (S318). The terminal may be inputted with whether to separately perform downloading of CAS S/Ws for the respective broadcasting channels, from the user (S318), for example, through a user interface shown in (B) of FIG. 4.

When it is determined to separately perform downloading of CAS S/Ws for respective broadcasting channels (S318: Yes), the terminal implements the step S312. Thereafter, the steps S314 and S316 may be implemented as described above.

When it is determined not to separately perform downloading of CAS S/Ws for respective broadcasting channels (S318:

No), the steps S320, S322, S324, S326, S328 and S316 may be implemented as described above.

In a second variation of the embodiment described above with reference to FIG. 3, when it is determined to automatically search broadcasting channels (S310: Yes), the step S312 may not be implemented immediately, and whether or not to perform downloading of CAS S/Ws for the respective broadcasting channels simultaneously with the automatic searching of broadcasting channels may be determined, and this is similar to the step S318. The terminal may be inputted with whether or not to perform downloading of CAS S/Ws for the respective broadcasting channels simultaneously with the automatic searching of broadcasting channels, from the user, for example, through the user interface shown in (B) of FIG. 4.

When it is determined to perform downloading of CAS S/Ws for the respective broadcasting channels simultaneously with the automatic searching of broadcasting channels, the step S312 is performed as described above. When it is determined not to perform downloading of CAS S/Ws for the respective broadcasting channels simultaneously with the automatic searching of broadcasting channels, the automatic search of broadcasting channels is performed in the step S312, and the steps S320, S322, S324, S326, S328 and S316 may be implemented as described above.

As a mater of course, the first variation and the second variation may be realized together.

Figure 5:
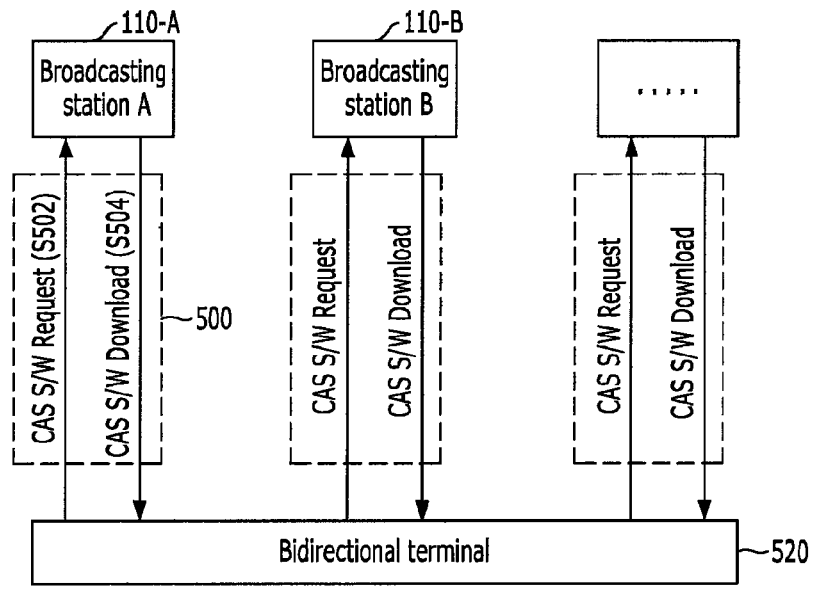
FIG. 5 is a chart explaining a method for downloading a CAS S/W in a bidirectional terminal in accordance with another embodiment of the present invention.

Hereinbelow, a method of downloading a CAS S/W in the steps S312 and S328 of FIG. 3 according to the embodiment of the present invention will be described with reference to FIG. 5.

A bidirectional terminal 520 transmits a message requesting a CAS S/W (a CAS S/W request message), to a corresponding broadcasting station or a trusted third party in the steps S312 and S328 (S502), and downloads the CAS S/W from the corresponding broadcasting station or the trusted third party (S504). In the case of requesting the CAS S/W to the trusted third party, the bidirectional terminal 520 may directly transmit a CAS S/W request message through a channel connected with the trusted third party or may transmit the CAS S/W request message through a corresponding broadcasting station which takes charge of a corresponding broadcasting channel.

In the step S312, the step S502 of transmitting the CAS S/W request message and the step S504 of downloading the CAS S/W are implemented for all searched channels 110-A, 110-B, . . . . In other words, the CAS S/W request message is transmitted to the corresponding broadcasting station which takes charge of each searched channel, and downloads the CAS S/W. In the step S328, the CAS S/W request message transmission step S502 and the CAS S/W downloading step S504 are implemented with respect to a broadcasting station, for example, 110-B, or a trusted third party corresponding to a pay channel/program selected by the user.

The bidirectional terminal 520 may implement the steps S502 and S504 after a security channel 500 is formed for a bidirectional channel with respect to the broadcasting station or the trusted third party.

In a CAS S/W, an operation for adding or changing a function may be performed for various reasons. In this case, the CAS S/W which is already installed and managed in a unidirectional or bidirectional terminal should be changed with a newly updated CAS S/W. Hereafter, a CAS S/W update process for a terminal under management will be described with reference to FIG. 6. The terminal under management is a terminal which has undergone a CAS S/W initial installation process as shown in FIG. 2 after it is placed on the market and has at least one CAS S/W in a memory. The update process according to FIG. 6 may be automatically implemented systematically without requiring participation of a user, for example, at midnight.

First, describing the case of a bidirectional terminal 520, the broadcasting station 110-A or the trusted third party broadcasts a signal (or information) indicating that a CAS S/W has been updated, to all bidirectional terminals 520 (S622). As an example of the signal (or information) indicating that a CAS S/W has been updated, a flag may be used without a limiting sense. Describing a concrete example for the use of the flag, a CAS S/W update flag may be placed in data to be transmitted from the broadcasting station 110-A or the trusted third party to the bidirectional terminal 520, and, when the CAS S/W update flag is 1, it may be indicated that a CAS S/W version has been updated. The bidirectional terminal 520 which receives the signal indicating that a CAS S/W has been updated requests the updated CAS S/W to the corresponding broadcasting station 110-A or the trusted third party (S624). Then, as the corresponding broadcasting station 110-A or the trusted third party transmits the updated CAS S/W to the bidirectional terminal 520 (S626), the bidirectional terminal 520 may update the CAS S/W placed in the memory by using the received CAS S/W. Such communication between the broadcasting station 110-A or the trusted third party and the terminal 520 may be implemented through a safe security channel 500. Unlike the above-described method, the bidirectional terminal 520 may adopt an update process for a unidirectional terminal 510 as described below, depending upon a policy of a broadcasting station or a CAS S/W manufacturer.

A unidirectional terminal 510 may receive an updated CAS S/W by using one of the following three methods depending upon a policy of a broadcasting station or a CAS S/W manufacturer, and may update the CAS S/W placed in the memory by using the received CAS S/W. In a first method, a broadcasting station 110-A or a trusted third party broadcasts a CAS S/W to all unidirectional terminals 510 (S612). In an example, a CAS S/W may be transmitted to the unidirectional terminals 510 through a carousel pattern. Even in the case of the unidirectional terminals 510, the broadcasting station 110-A or the trusted third party may broadcast a signal (or information) indicating that a CAS S/W version has been updated, to the unidirectional terminals 510 (S614). The step S614 may be implemented before or simultaneously with the step S612. Such communication between the broadcasting station 110-A or the trusted third party and the terminals 510 may be implemented through a safe security channel 500. A second method uses the method of the step S210-1, and a third method uses the method of the step S210-5.

Figure 6:
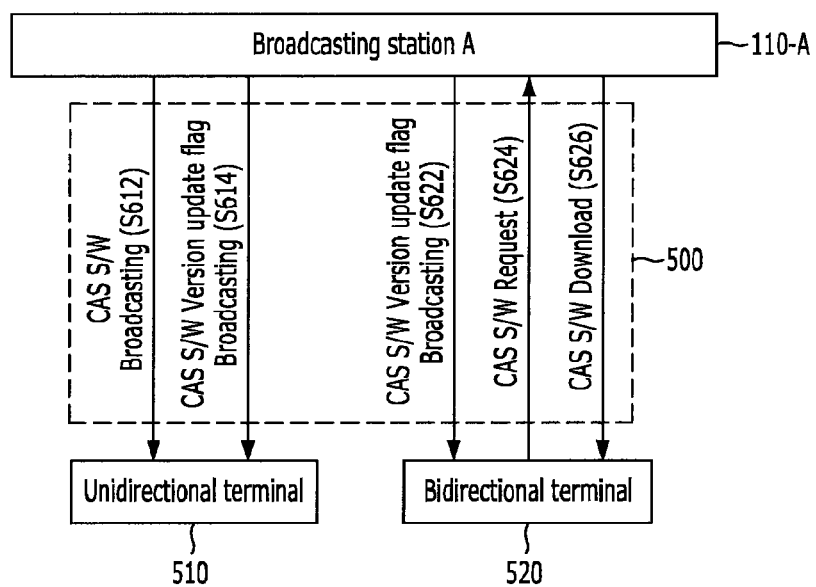
FIG. 6 is a chart explaining a method for updating a CAS S/W in accordance with another embodiment of the present invention.

Besides the methods shown in FIG. 6, a CAS S/W may be updated using other methods. The unidirectional terminal may receive the CAS S/W which is repeatedly broadcasted by the broadcasting station 110-A or the trusted third party, and may update the corresponding CAS S/W placed in the memory by using the received CAS S/W in the case where the received CAS S/W is a newer version than the CAS S/W stored in the memory. As aforementioned above, the bidirectional terminal may check whether or not a CAS S/W for receiving the pay channel/program selected in the step S324 exists in the memory of the terminal. At this time, in the case where the corresponding CAS S/W exists in the memory and a CAS S/W to be transmitted from the corresponding broadcasting station or the trusted third party is a newer version than the CAS S/W stored in the memory, the CAS S/W of the new version may be received, and the corresponding CAS S/W placed in the memory may be updated by using the received CAS S/W. Also, the bidirectional terminal may adopt the method which is applied to the unidirectional terminal.

Figure 7:
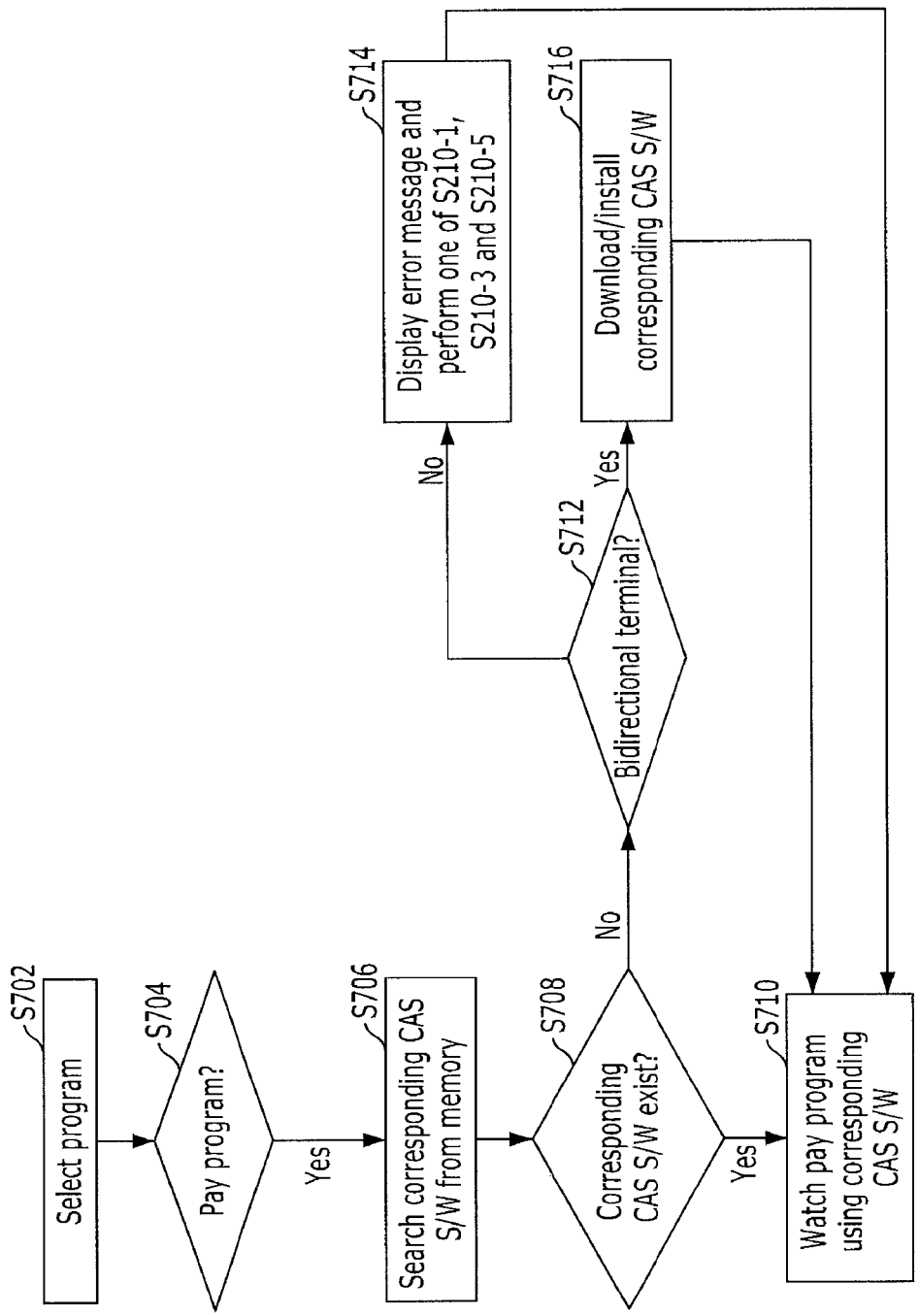
FIG. 7 is a flow chart explaining a method for selecting a CAS S/W in conjunction with a program change in accordance with another embodiment of the present invention.

Hereafter, a method for selecting a CAS S/W in conjunction with a program change in accordance with another embodiment of the present invention will be described with reference to FIG. 7.

If a program to be watched by a user is changed (selected) by the user (S702), a terminal checks if the selected program is a pay program (S704).

In the case where the selected program is a pay program (S704: Yes), the terminal checks whether a CAS S/W corresponding to the program selected by the user exists in the memory (S706). In the case where the selected program is a free program, the user may watch the selected free program without the CAS S/W.

As a result of the search in the step S706, if the corresponding CAS S/W exists in the memory (S708: Yes), the terminal allows the user to watch the selected pay program by using the corresponding CAS S/W (S710).

As a result of the search in the step S706, if the corresponding CAS S/W does not exist in the memory (S708: No), different processes are taken depending upon the type of the terminal. In the case of a bidirectional terminal (S712: Yes), according to the method of the step S328 shown in FIG. 3, the corresponding CAS S/W is downloaded from the corresponding broadcasting station or the trusted third party and installed (S716). In the case of a unidirectional terminal (S712: No), an error message that the corresponding CAS S/W does not exist in the memory is displayed, and the corresponding CAS S/W is installed in the terminal by using one of the steps S210-1, S210-3 and S210-5 (S714). Then, the terminal allows the user to watch the selected pay program by using the CAS S/W installed through the step S714 or S716 (S710).

Hereinbelow, the configurations of a broadcasting station 820 and a terminal 800 in the conditional access system realized in the above-described way will be described with reference to FIG. 8. Repeated descriptions will be omitted herein.

First, the terminal 800 may include an input unit 802, a control unit 804, a reception unit 806, and a transmission unit 808.

The input unit 802 is inputted with a program to watch, from a user. For example, as in the steps S314, S320 and S702, the terminal 800 is selected with a program for the user to watch, through the input unit 802. Also, in addition to the selection of a program, the input unit 802 may be inputted with information necessary for realization of the above-described method according to the present invention, from the user. For example, the input unit 802 may be inputted with necessary information from the user through the user interfaces as shown in FIG. 4.

The reception unit 806 may receive a CAS S/W and a program according to the method of the present invention. Besides, the reception unit 806 may receive data necessary for realizing the method of the present invention from an external device such as the broadcasting station 820 or a trusted third patty. The reception unit 806 may receive necessary data not only through a broadcasting channel but also through an Internet network or a telephone network according to the above-described method of the present invention.

The transmission unit 808 may transmit data necessary for realizing the above-described method of the present invention to an external device such as the broadcasting station 820 or the trusted third party. The transmission unit 808 may transmit necessary data through an Internet network or a telephone network excluding a return channel. In this regard, only the transmission unit of a bidirectional terminal excluding a unidirectional terminal may transmit necessary data through a return channel.

The control unit 804 may perform all functions necessary for realizing the method of the present invention, excluding the functions performed by the input unit 802, the reception unit 806 and the transmission unit 808.

The terminal 800 may further includes at least any one of a storage unit 810 configured to store necessary data such as a CAS S/W and a program and an output unit 812 configured to output a program or an error message.

The broadcasting station 820 may include a reception unit 822 and a transmission unit 824.

The reception unit 822 may receive data necessary for realizing the above-described method of the present invention from an external device such as the terminal 800. The reception unit 822 may receive the necessary data through a return channel only for a bidirectional terminal.

The transmission unit 824 may transmit a CAS S/W and a program according to the method of the present invention. Besides, the transmission unit 824 may transmit data necessary for realizing the method of the present invention to the external device such as the terminal 800.

In accordance with the exemplary embodiments of the present invention, when respective channels (broadcasting stations or programs) use different security clients, all the security clients can be remotely installed and updated in a terminal, so that a security client conforming to a specific program selected by a user can be selected to permit watching of the specific program.

While the present invention has been described with respect to the specific embodiments, it will be apparent to those skilled in the art that various changes and modifications may be made without departing from the spirit and scope of the invention as defined in the following claims.

What is claimed is:

1. A method for installing different security clients for channels in a terminal in a conditional access system, the method comprising:
   searching one or more channels searchable in the terminal;
   requesting, for respective searched channels, security clients necessary for receiving pay programs to be transmitted through the respective searched channels, to respective broadcasting stations which respectively take charge of the respective searched channels; and
   respectively downloading and installing, for the respective searched channels, the requested security clients from the respective broadcasting stations,
   wherein a first security client is remotely downloaded and installed for a first channel from a first broadcasting station of the first channel in the terminal, and a first program corresponding to the first channel is received from the first broadcasting station in the terminal,
   wherein a second security client is remotely downloaded and installed for a second channel from a second broadcasting station of the second channel in the terminal, and a second program corresponding to the second channel is received from the second broadcasting station in the terminal,
   wherein the terminal is configurable, upon a user's selection, to download and install the security clients in advance when the respective channels are searched in the terminal.

2. The method of claim 1, further comprising:
   receiving signals indicating that versions of the security clients are updated, from the respective broadcasting stations;

requesting version-updated security clients to the respective broadcasting stations after receiving the signals;
downloading the requested version-updated security clients from the respective broadcasting station; and
updating already stored security clients using the downloaded version-updated security clients.

3. The method of claim 1, further comprising:
selecting by a user a program to be received;
searching whether a security client necessary for receiving the selected program is already stored, in the case where the selected program is a pay program;
requesting the security client for the selected program to a broadcasting station corresponding to the selected program, in the case where the security client for the selected program is not already stored; and
downloading the requested security client for the selected program, from the broadcasting station corresponding to the selected program.

4. A method for installing different security clients for channels in a terminal in a conditional access system, the method comprising:
receiving security clients necessary for receiving pay programs to be transmitted through one or more channels, which are repeatedly broadcasted through respective broadcasting stations which respectively take charge of the respective channels; and
respectively installing the security clients received from the respective broadcasting stations,
wherein a first security client is remotely downloaded and installed for a first channel from a first broadcasting station of the first channel in the terminal, and a first program corresponding to the first channel is received from the first broadcasting station in the terminal,
wherein a second security client is remotely downloaded and installed for a second channel from a second broadcasting station of the second channel in the terminal, and a second program corresponding to the second channel is received from the second broadcasting station in the terminal,
wherein the terminal is configurable, upon a user's selection, to download and install the security clients in advance when the respective channels are searched in the terminal.

5. The method of claim 4, further comprising:
receiving signals indicating that versions of the security clients are updated, from the respective broadcasting stations;
respectively downloading version-updated security clients from the respective broadcasting stations; and
updating already stored security clients using the downloaded version-updated security clients,
wherein said downloading version-updated security clients from the respective broadcasting stations is implemented after the signals are received or simultaneously with said receiving signals.

6. The method of claim 4, further comprising:
selecting by a user a program to be received;
searching whether a security client necessary for receiving the selected program is already stored, in the case where the selected program is a pay program;
requesting the security client for the selected program to a broadcasting station corresponding to the selected program, in the case where the security client for the selected program is not already stored; and
downloading the requested security client for the selected program, from the broadcasting station corresponding to the selected program.

7. A terminal for installing different security clients for channels in a conditional access system, the terminal comprising:
a control unit configured to search one or more channels searchable in the terminal;
a reception unit configured to request, for respective searched channels, security clients necessary for receiving pay programs to be transmitted through the respective searched channels, to respective broadcasting stations which respectively take charge of the respective searched channels; and
a transmission unit configured to respectively download and install, for the respective searched channels, the requested security clients from the respective broadcasting stations,
wherein the control unit installs the downloaded security clients,
wherein a first security client is remotely downloaded and installed for a first channel from a first broadcasting station of the first channel in the terminal, and a first program corresponding to the first channel is received from the first broadcasting station in the terminal,
wherein a second security client is remotely downloaded and installed for a second channel from a second broadcasting station of the second channel in the terminal, and a second program corresponding to the second channel is received from the second broadcasting station in the terminal,
wherein the terminal is configurable, upon a user's selection, to download and install the security clients in advance when the respective channels are searched in the terminal.

8. The terminal of claim 7,
wherein the reception unit receives signals indicating that versions of the security clients are updated, from the respective broadcasting stations,
wherein the transmission unit requests version-updated security clients to the respective broadcasting stations after receiving the signals,
wherein the reception unit downloads the requested version-updated security clients from the respective broadcasting station, and
wherein the control unit updates already stored security clients using the downloaded version-updated security clients.

9. The terminal of claim 7, further comprising:
an input unit configured to select by a user a program to be received,
wherein the control unit searches whether a security client necessary for receiving the selected program is already stored, in the case where the selected program is a pay program,
wherein the transmission unit requests the security client for the selected program to a broadcasting station corresponding to the selected program, in the case where the security client for the selected program is not already stored, and
wherein the reception unit downloads the requested security client for the selected program, from the broadcasting station corresponding to the selected program.

10. A terminal for installing different security clients for channels in a conditional access system, the terminal comprising:
a reception unit configured to receive security clients necessary for receiving pay programs to be transmitted through one or more channels, which are repeatedly broadcasted through respective broadcasting stations which respectively take charge of the respective channels; and a control unit configured to respectively install the security clients received from the respective broadcasting stations, wherein a first security client is remotely downloaded and installed for a first channel from a first broadcasting station of the first channel in the terminal, and a first program corresponding to the first channel is received from the first broadcasting station in the terminal, wherein a second security client is remotely downloaded and installed for a second channel from a second broadcasting station of the second channel in the terminal, and a second program corresponding to the second channel is received from the second broadcasting station in the terminal.

11. The terminal of claim 10, wherein the reception unit receives signals indicating that versions of the security clients are updated, and respectively downloads version-updated security clients, from the respective broadcasting stations;

where in the control unit updates already stored security clients using the downloaded version-updated security clients, and wherein the reception unit receives the version-updated security clients after the signals are received or together with the signals.

12. The terminal of claim 10, further comprising:

an input unit configured to select by a user a program to be received, wherein the control unit searches whether a security client necessary for receiving the selected program is already stored, in the case where the selected program is a pay program, wherein the transmission unit requests the security client for the selected program to a broadcasting station corresponding to the selected program, in the case where the security client for the selected program is not already stored, and wherein the reception unit downloads the requested security client for the selected program, from the broadcasting station corresponding to the selected program.

* * * * *